W. B. HAUSMAN.
APPARATUS FOR THE REALISTIC REPRODUCTION OF AERIAL MOTION PICTURES.
APPLICATION FILED MAR. 27, 1914.
1,192,894.
Patented Aug. 1, 1916.
2 SHEETS—SHEET 1.
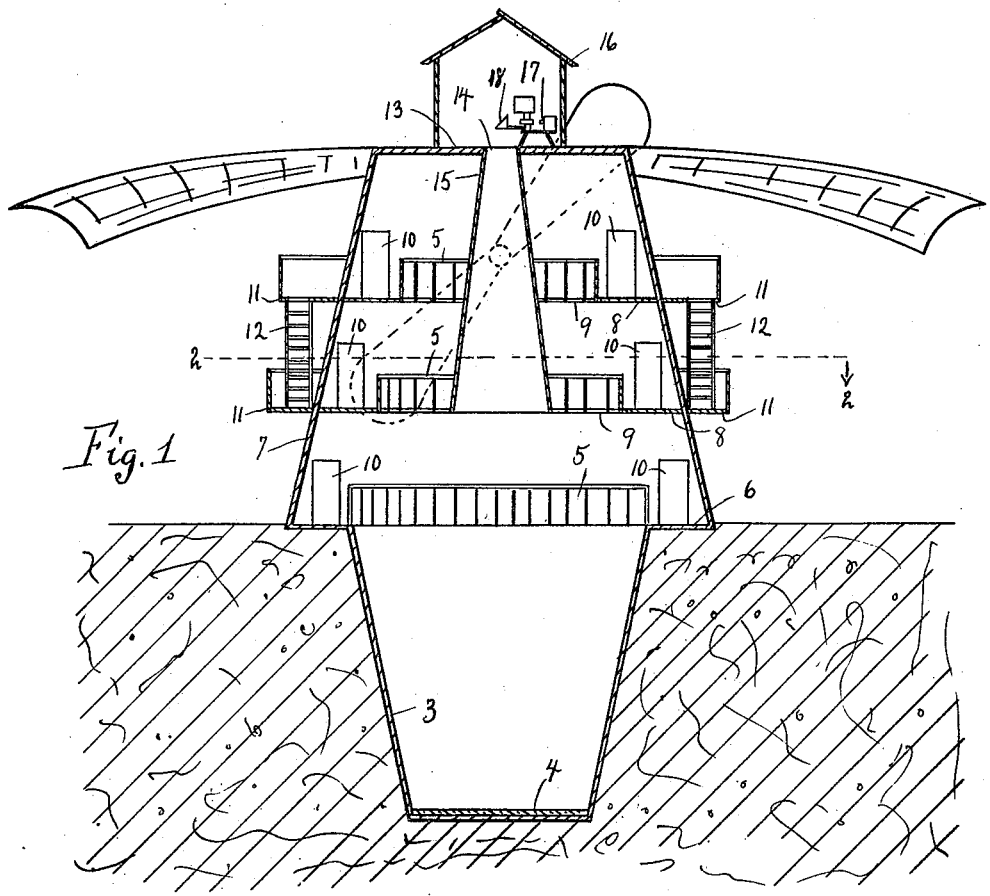
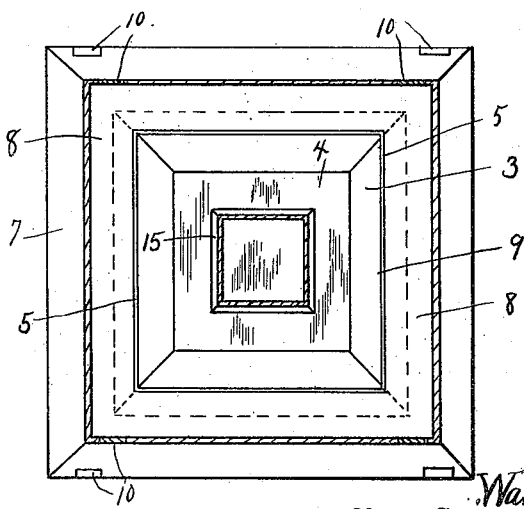
Witnesses:
H. W. Burton
Inventor
Ward B. Hausman
By Attorney
W. W. Williamson W. B. HAUSMAN.
APPARATUS FOR THE REALISTIC REPRODUCTION OF AERIAL MOTION PICTURES.
APPLICATION FILED MAR. 27, 1914.
1,192,894.
Patented Aug. 1, 1916.
2 SHEETS—SHEET 2.
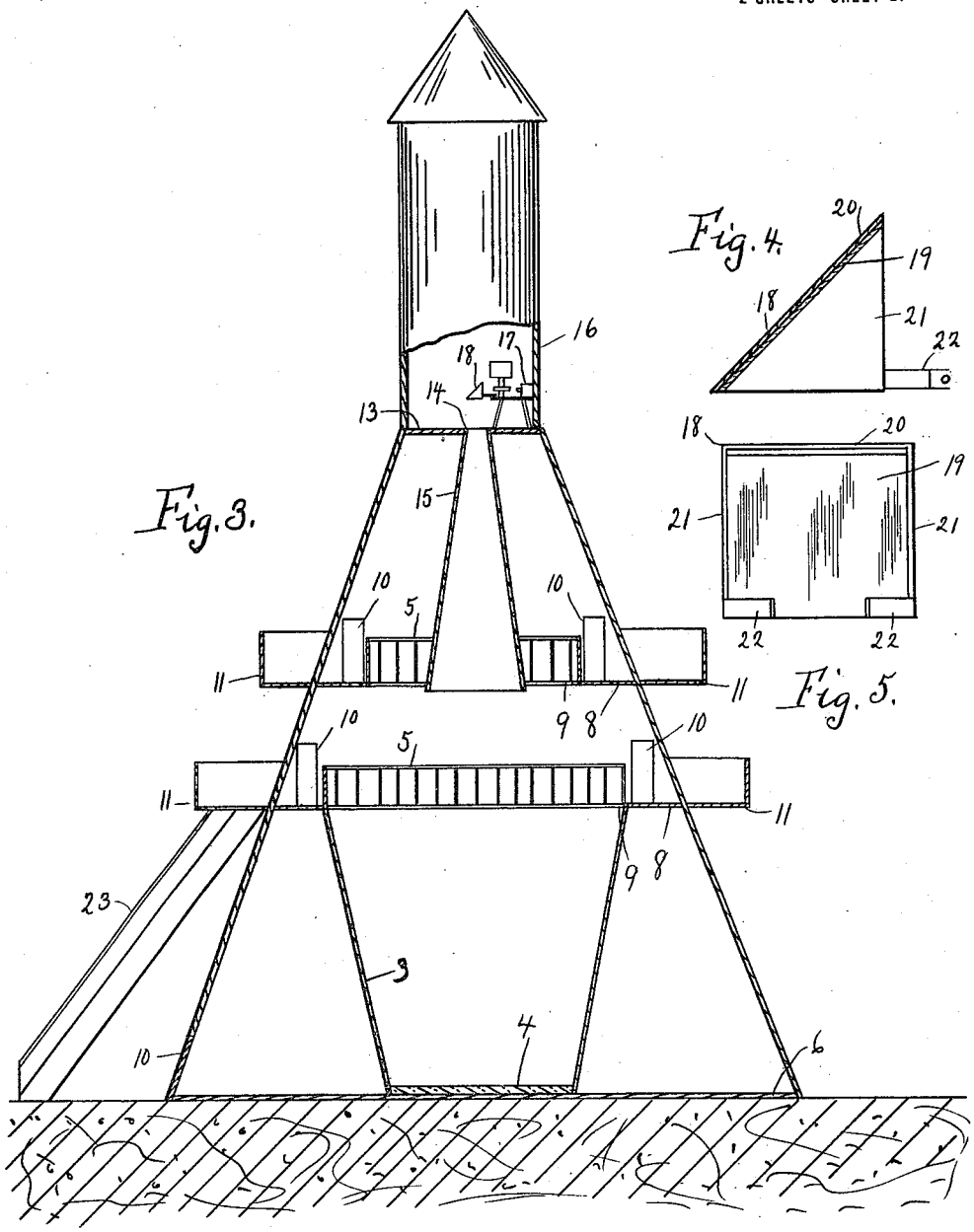

UNITED STATES PATENT OFFICE.

WARD B. HAUSMAN, OF PHILADELPHIA, PENNSYLVANIA.

APPARATUS FOR THE REALISTIC REPRODUCTION OF AERIAL MOTION-PICTURES.

1,192,894.      Specification of Letters Patent.      Patented Aug. 1, 1916.

Application filed March 27, 1914. Serial No. 827,594.

*To all whom it may concern:*

Be it known that I, WARD B. HAUSMAN, a citizen of the United States, residing at Philadelphia, in the county of Philadelphia and State of Pennsylvania, have invented new and useful Improvements in Apparatus for the Realistic Reproduction of Aerial Motion-Pictures, of which the following is a specification.

My invention relates to new and useful improvements in apparatus for the realistic reproduction of aerial motion pictures, and has for its object to provide a device of this character, whereby pictures which are taken above the object may be realistically reproduced, so that the spectators or audience may see the objects in their true form, as they are seen by a photographer, and when such pictures are taken from an airship or balloon the audience witnessing the reproduction will have all of the sensations as though they were riding in an airship without encountering any perils.

A further object of the invention is to provide an apparatus of this character in which the screen or surface on which the pictures are to be reproduced will be situated on a horizontal plane, instead of on a vertical plane, and further to provide means for projecting the rays of light from the reproducing camera to the horizontal screen.

A still further object of the invention is to provide a well or shaft at the bottom of which is situated the screen and above which is situated an auditorium preferably in the form of a number of superimposed balconies, said balconies being arranged in staggered relation to one another in order that the lower ones will not obstruct the view from the upper ones.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a vertical sectional view of an apparatus constructed in accordance with my improvement illustrating the well situated below the ground. Fig. 2, is a section at the line 2—2 of Fig. 1, the outer platforms being removed. Fig. 3, is a view similar to Fig. 1, illustrating a modified form of my invention in which the well or shaft is situated above the ground. Fig. 4, is an enlarged vertical sectional view of my improved deflector or lens for projecting the rays of light from the reproducing camera to the screen; and Fig. 5, is an edge view thereof.

In carrying out my invention as here embodied, in Figs. 1 and 2, 3 represents the well or shaft situated below the surface of the earth and having at the bottom thereof a screen 4 or surface on which the picture is to be projected, the side walls of the well or shaft preferably diverging from their lower ends toward their upper ends.

About the upper ends of the well is built a railing 5 over which the audience witnesses the pictures from the main floor 6 which is the first floor of the building or theater 7. About the main floor 6 may be built a number of balconies 8, each extending entirely around the building, having the center portion open as at 9, which is protected by a railing 5 similar to the one at the upper end of the well.

Access to the different floors is obtained through the doors 10, the doors 10 on the main floor leading directly from the pavements, while the doors 10 to the balconies lead from platforms 11 on the outside of the building which are connected with each other and with the pavement by the stairs 12.

At or adjacent the top of the theater building is formed the operator's floor 13 having a hole 14 therein from which depends a light shield 15, the side walls of which diverge toward their lower ends. In the operator's room 16 is situated the reproducing camera 17, which may be arranged to project the rays of light in a vertical line to the screen 4, or the ordinary reproducing camera may be provided with a deflector 18, preferably in the form of a prism 19, which is set in an open work casing 20, having angular side walls 21, the latter being provided with brackets 22 for attaching the deflector to the reproducing camera. Of course it will be understood that the deflector may be situated above the opening 14 in any suitable manner, it being unnecessary to attach the same directly to the reproducing camera.

When pictures are taken above an object, as from a flying machine, and reproduced upon a vertical screen it is impossible for a person to obtain the correct idea of the object being reproduced but by the use of my improvement a picture taken of an object above the same, may be reproduced on the horizontal screen in a position below the audience, thus permitting the audience to view the picture of the object, the same as it is taken, and it has been found that this will produce all of the sensations of a ride in an airship.

In that form of my invention illustrated in Fig. 3, I have shown the well or shaft 3 set above the surface of the earth and the floors from which the audience witnesses the exhibition are all in the form of balconies, some distance above the surface of the earth, the same being reached by a flight of stairs 23 leading to one of the outside platforms.

The theater building forming a part of the apparatus may be of any desired size and shape, and the configuration may be arranged to represent aerial planes, dirigibles, balloons, sky rockets and the like, so as to give a person the impressions entering an aerial device.

Of course I do not wish to be limited to the exact details of construction here shown, as these may be varied within the limits of the appended claims without departing from the spirit of my invention.

Having thus fully described my invention, what I claim as new and useful, is—

1. An apparatus for the realistic reproduction of aerial motion pictures comprising a building having an operator's floor for dividing the building into an operator's room and an auditorium, said operator's floor having a hole therein through which are projected rays of light from a reproducing camera, a light shield depending from the operator's floor and surrounding the hole therein, the walls of said light shield diverging toward its lower end and spaced from the walls of the building, spectators' floors situated one above the other, each extending beyond the preceding one below, a well situated beneath the lowermost spectator's floor and having its walls converging toward its lower end and a screen for projecting pictures thereon, situated at the bottom of the well.

2. In an apparatus for realistic reproduction of aerial motion pictures comprising inclosing walls, a horizontal screen on which pictures are to be projected from a reproducing camera, and an auditorium situated above the screen comprising a number of balconies each of which extends beyond the preceding one below.

3. In an apparatus for realistic reproduction of aerial motion pictures comprising inclosing walls, a horizontal screen on which pictures are to be projected from a reproducing camera, an auditorium situated above the screen comprising a number of balconies each of which extends beyond the preceding one below, and a light shield situated between the screen and the reproducing camera.

In testimony whereof, I have hereunto affixed my signature in the presence of two subscribing witnesses.

WARD B. HAUSMAN.

Witnesses:
T. FOSTER THOMAS,
LEONARD W. BELZ.

Copies of this patent may be obtained for five cents each, by addressing the "Commissioner of Patents, Washington, D. C."